United States Patent [19]

Natori

[11] Patent Number: 4,558,905

[45] Date of Patent: Dec. 17, 1985

[54] SEAT FOR VEHICLES

[75] Inventor: Takashi Natori, Akishima, Japan

[73] Assignee: Tachikawa Spring Co., Ltd., Japan

[21] Appl. No.: 583,034

[22] Filed: Feb. 23, 1984

[51] Int. Cl.[4] .............................................. A47C 7/02
[52] U.S. Cl. ...................................... 297/452; 5/402; 297/219
[58] Field of Search .................. 5/402, 407, 408, 421, 5/458, 472; 297/180, 452, 456, 455, 457

[56] References Cited

U.S. PATENT DOCUMENTS 3,222,696 12/1965 Grimshaw ................................ 5/402
3,630,572 12/1971 Homier ............................ 297/219 X

FOREIGN PATENT DOCUMENTS 8001414 10/1981 Netherlands ......................... 297/180

Primary Examiner—James T. McCall
Attorney, Agent, or Firm—Cushman, Darby & Cushman

[57] ABSTRACT

A seat for use in a vehicle, airplane or the like is disclosed which comprises a top layer member incorporating heating elements therein. Each of the heating elements is enclosed by a cover which is extended with an integral hang portion for fixing the top layer member. The hang portion is fixedly secured to a fixing member provided within the seat.

4 Claims, 8 Drawing Figures

SEAT FOR VEHICLES

BACKGROUND OF THE INVENTION

1. Field of the Invention

The present invention relates to a seat to be used in vehicles or airplanes, and, more particularly, to an improved seat which includes heating elements within its top layer members for heating the body of an occupant.

2. Description of the Prior Art

In FIG. 1, there is shown a portion of one of conventional seats of this type. As illustrated in FIG. 1, this conventional seat contains face-type heating elements (b-1, b') within its top layer member (a) forming a top surface portion of the seat and the heating element with a cover (b-1) is inserted into the top layer member (a), with one end of such heating element being secured to a hang-in member (10) by a clip (11) so as to fix the heating element (b'). Accordingly, after the hang-in member (10) has been sewn to the top layer member (a), the heating element (b-1) which has been inserted into the top layer member (a) must be secured to such hang-in member (10) by a clip. As a result of this, the conventional seat tends to be more complicated and thus more difficult to assemble.

In FIG. 1, references (a₁), (a₂) and (a₃) designate an air-permeable top layer, a wadding of a foam material such as urethane foam, and a wadding cover of a cloth, respectively. The top layer member (a) mentioned above is formed by laminating these three members, i.e., (a₁), (a₂) and (a₃). Reference numeral (12) in FIG. 1 represents a wire inserted through the bag-like end of the hang-in member (10), which wire (12) is secured to a fixing wire embedded in a cushion member (c) of a foam material by means of a hog ring or the like. The other end of the heating element (b') is fixed to a seat frame or the like in a suitable manner. The top layer member (a) includes a cloth on its underside for fixing the top layer member (a) onto the surface of the cushion member (c). The hang-in member (10) is formed of a cloth and the end of this member, as mentioned above, is sewn to form a bag through which the wire (12) is inserted.

SUMMARY OF THE INVENTION

The vehicle seat of the invention can eliminate the drawbacks of the prior art structure for fixing heating elements.

Accordingly, the main object of the invention is to provide a seat which has a simple structure for fixing its heating elements.

In order to achieve this object, one end of the cover of the heating element is extended to form a hang-in member and this hang-in member is sewn onto the underside of a top layer member. Thus, there is no need to secure a portion of the heating element to the hang-in member with a clip, which is necessary in the prior art seat.

Other object of the invention is to provide a seat in which heating elements can be positively fixed. To attain this object, according to the invention, the cover of the heating element is directly sewn onto a top layer member.

In addition, the seat of the invention is characterized in that one end of the cover of its heating element is extended to form a hang-in member to eliminate the need for providing a separate hang-in member as in the conventional vehicle seat.

DETAILED DESCRIPTION OF A PREFERRED EMBODIMENT OF THE PRESENT INVENTION

Figure 1:
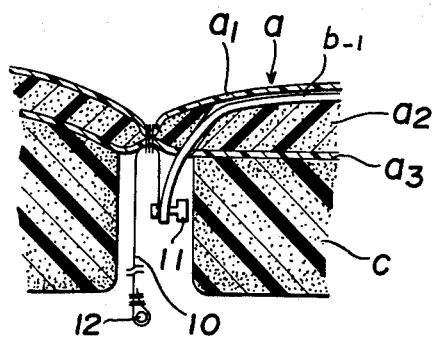
FIG. 1 is a partially enlarged longitudinal section view of a conventional seat.
Figure 2:
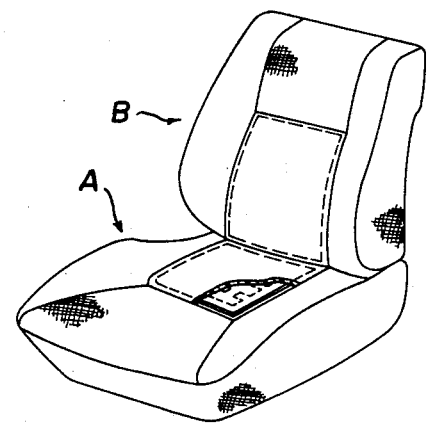
FIG. 2 is a partially broken-away, perspective view of an embodiment constructed in accordance with the present invention.

FIG. 2 illustrates the vehicle or automotive seat of the invention with its part broken away, in which a seat cushion (A) and a seat back (B) incorporate face-like heating elements (2)(2) in their respective parts.

Figure 4:
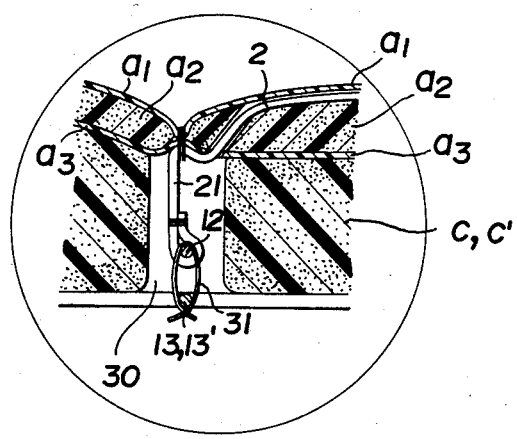
FIG. 4 is an enlarged longitudinal section view of main portions of the invention.
Figure 3:
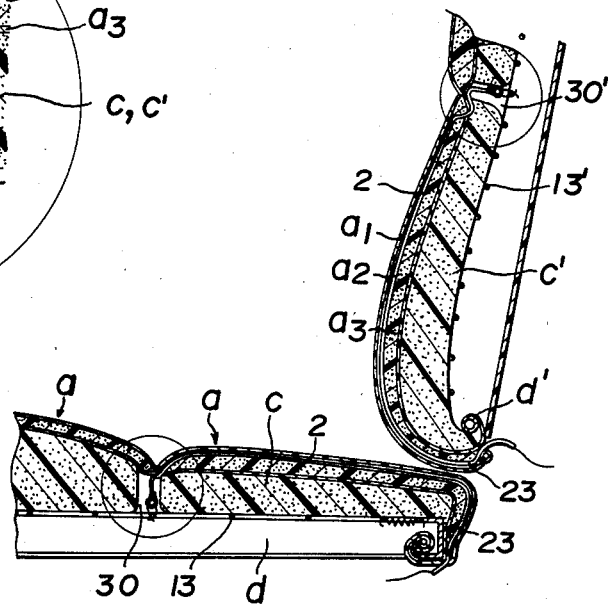
FIG. 3 is a partially broken-away, longitudinal section view; of the above embodiment of the invention.

FIGS. 3 and 4 show how the heating elements (2)(2) are fixed in the seat cushion (A) and the seat back (B), respectively. In the drawings, a reference (a) designates a top layer member which comprises an air permeable top layer (a1), a wadding (a2) formed of foam material and a wadding cover (a3). Heating element (2) is interposed between the wadding (a2) and the top layer (a1) so as to be capable of heating the hip and back portions of an occupant of the seat. Reference (c)(c') denote cushion members made of foam material such as urethane foam, respectively, which cushion members (c)(c') are placed on spring members (13)(13') extended over frames (d)(d'), respectively. One frame (d) shown is made of a plate metal and the other frame (d') is of a pipe. Cushion members (c)(c') are formed in their suitable portions with grooves (30)(30') into each of which there is inserted a respective hang portion (22) to be described later. The tip ends of each hang portion (22) are respectively secure to suitable fixing members, such as the spring members (13)(13').

Reference (2) represents a heating element, which comprises an electric wire (2a) to generate heat when energized and a cover (2b) made of a cloth for enclosing this electric wire (2a). Specifically, this electrical wire (2a) is arranged in a waved manner within the cover (2b) and has its one end connected with a cord (21), which cord (21) is extended externally of the seat and is secured to a battery provided in the relevent vehicle or airplane. The cord (21) is provided with a switch in its suitable position and this switch is thus operable to energize the electric wire (2a) for generation of heat as necessary.

The cover (2b) of the heating element (2) is extended at its one end with a hang portion (22) and at its other end, which is located on the cord (21) side, with a fixing portion (23). Fixing portion (23), along with the end of the top layer member (a), is secured to the frame (d)(d') by means of hog rings or the like.

The hang portion (22), as shown partly in FIG. 4, is fixed to the underside of the top layer member (a) by sewing or adhesion, and is further inserted into the grooves (30)(30') formed in the cushion members (c)(c') with the tip end of the hang portion being connected to the spring members (13)(13') through a hog ring (31). In the drawings, reference numeral (12) denotes a wire which is inserted through a bag-like portion provided at the tip end of the hang portion (22). The tip end of the hang portion (22), together with wire (12), is connected to the spring members (13)(13'). Thus, such connection portion is capable of uniformly hanging in at least the whole hang portion (22).

Figure 5:
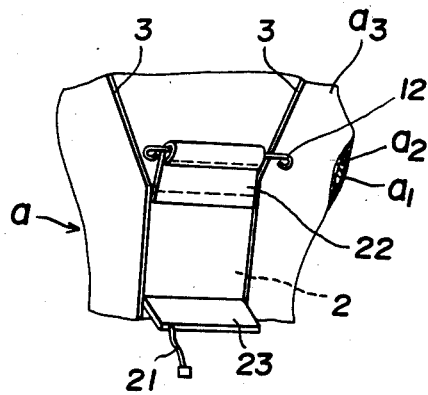
FIG. 5 is a bottom view of a top layer member of the invention which is provided with a heating element.

FIG. 5 illustrates the heating element (2) which has been mounted to the underside of the top layer member (a). Specifically, the heating element (2) is inserted between the top layer (a1) and the wadding (a2) and the hang portion (22) and fixing portion (23) of the cover (2b) as well as the cord (21) are exposed externally of the top layer member (a). In this figure, (3) (3) denote sewn portions of the top layer member (a), which top layer member (a) is formed by sewing together a plurality of small pieces which have been cut in their respective predetermined configuartions.

Figure 6:
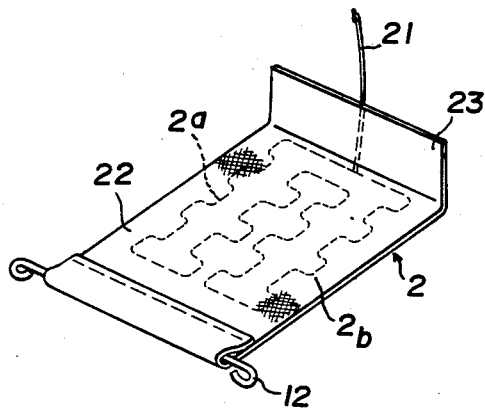
FIGS. 6 to 8 are respectively perspective views illustrating the embodiments of the heating elements of the invention.
Figure 7:
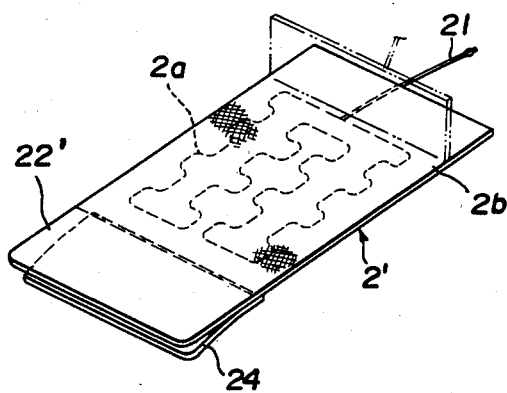
Figure 8:
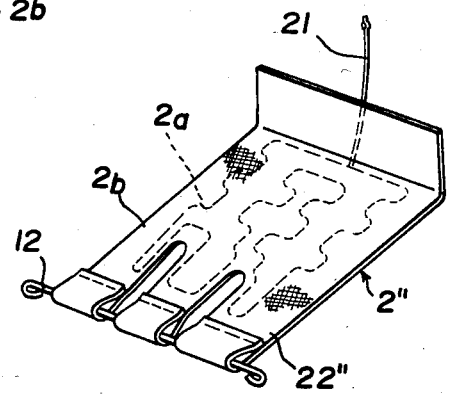

FIGS. 6, 7 and 8 illustrate embodiments of the heating elements (2) according to the invention, respectively. Specifically, FIG. 6 shows the same heating element (2) as in FIGS. 3 and 4, in which a cover (2b) formed of the same member as in the conventional heating element is extended at its one end with a hang portion (22) and the tip end of this hang portion (22) is folded back to be sewn to the hang portion itself, with a wire (12) inserted through this folded portion. FIG. 7 illustrates an alternate embodiment of heating element of the invention, in which the cover (2b) is extended to form a hang portion (22') and a hard synthetic resin member (24) is attached to this hang portion (22') for easy insertion of a wire (2a) into a recessed groove (30) in the cushion member (c) as well as in order to be able to use this hard synthetic resin member (24) as a substitution for said wire (12). In other words, the hard synthetic resin member (24) and a fixing member in the lower portion of the relevent seat can be fixedly secured by means of hog rings or other suitable connection means.

FIG. 8 illustrates another embodiment of the heating element (2″) of the invention, wherein a cover (2b) for heating element (2″) includes a split-type hang portion (22″) which is split according to the pattern of the seat and wherein a wire (12) is inserted through such split-type hang portion (22″).

What is claimed is:

1. A seat for use in vehicles comprising a top layer member, a fixing member provided within said seat, heating elements within said top layer member, a cover member enclosing said heating elements, said cover member being extended to form an integral hang portion, and means for securing said hang portion to said top layer member, said hang portion being hung in and fixed to said fixing member, wherein said hang portion includes a tip end formed in a bag-like configuration and a wire inserted through said bag-like configuration.

2. The seat as recited in claim 1, wherein said heating element includes an electrical wire which generates heat when electrically energized and wherein said electrical wire is enclosed by said cover.

3. The seat as recited in claim 1 wherein a hog ring connects said hang portion, together with said wire, to said fixing member.

4. A seat for use in vehicles comprising a top layer member, a fixing member provided within said seat, heating elements within said top layer member, a cover member enclosing said heating elements, said cover member being extended to form an integral hang portion, and means for securing said hang portion to said top layer member, said hang portion being hung in and fixed to said fixing member, wherein said hang portion is formed of a hard synthetic resin plate having sufficient hardness for said plate to be fixed to said fixing member by means of a hog ring.

* * * * *